United States Patent
Ueda (10) Patent No.: US 8,203,100 B2
(45) Date of Patent: Jun. 19, 2012

(54) PULSE ARC WELDING METHOD

(75) Inventor: Yuji Ueda, Osaka (JP)

(73) Assignee: DAIHEN Corporation, Osaka (JP)

( * ) Notice: Subject to any disclaimer, the term of this patent is extended or adjusted under 35 U.S.C. 154(b) by 389 days.

(21) Appl. No.: 12/689,644

(22) Filed: Jan. 19, 2010

(65) Prior Publication Data

US 2010/0181296 A1  Jul. 22, 2010

(30) Foreign Application Priority Data

Jan. 21, 2009 (JP) ................................. 2009-010502

(51) Int. Cl.
*B23K 9/10* (2006.01)
(52) U.S. Cl. ......... 219/130.51; 219/137 PS; 219/130.21
(58) Field of Classification Search ............. 219/130.51, 219/130.31–130.33, 137 PS, 130.21, 136
See application file for complete search history.

(56) References Cited

U.S. PATENT DOCUMENTS

| | | | |
|---|---|---|---|
| 7,145,101 | B2 | 12/2006 | Tong |
| 7,598,475 | B2 * | 10/2009 | Kawamoto et al. ...... 219/130.51 |
| 2003/0080101 | A1 | 5/2003 | Flood et al. |
| 2007/0210048 | A1 | 9/2007 | Koshiishi et al. |

FOREIGN PATENT DOCUMENTS

| | | |
|---|---|---|
| DE | 198 08 383 | 9/1999 |
| EP | 2 018 928 | 1/2009 |
| JP | 60-56486 | 4/1985 |
| JP | 8-318375 | 12/1996 |
| JP | 2005-28383 | 2/2005 |
| JP | 2005-118872 | 5/2005 |
| JP | 2005-262250 | 9/2005 |
| JP | 2006-75890 | 3/2006 |

* cited by examiner

*Primary Examiner* — David Lam
(74) *Attorney, Agent, or Firm* — Hamre, Schumann, Mueller & Larson, P.C.

(57) ABSTRACT

A pulse arc welding method is provided for performing welding by causing welding current to flow through a welding wire and a base metal via a power supply tip. The welding current has a pulse cycle made up of a first peak time, a second peak time and a base time. A first peak current is applied during the first peak time, a second peak current, smaller than the first peak current, is applied during the second peak time, and a base current is applied during the base time. When a tip-base distance between an end of the power supply tip and the base metal is smaller or greater than a reference value, the first peak current is increased or decreased in accordance with the difference between the reference value and the tip-base distance.

2 Claims, 10 Drawing Sheets

Welding Current Average: 150A

PULSE ARC WELDING METHOD

BACKGROUND OF THE INVENTION

1. Field of the Invention

The present invention generally relates to a pulse arc welding method. In particular, the present invention relates to a pulse arc welding method that enables stable welding, even when the mixture ratio of shielding gas varies and the distance between the power supply tip and the base metal changes.

2. Description of the Related Art

Figure 9:
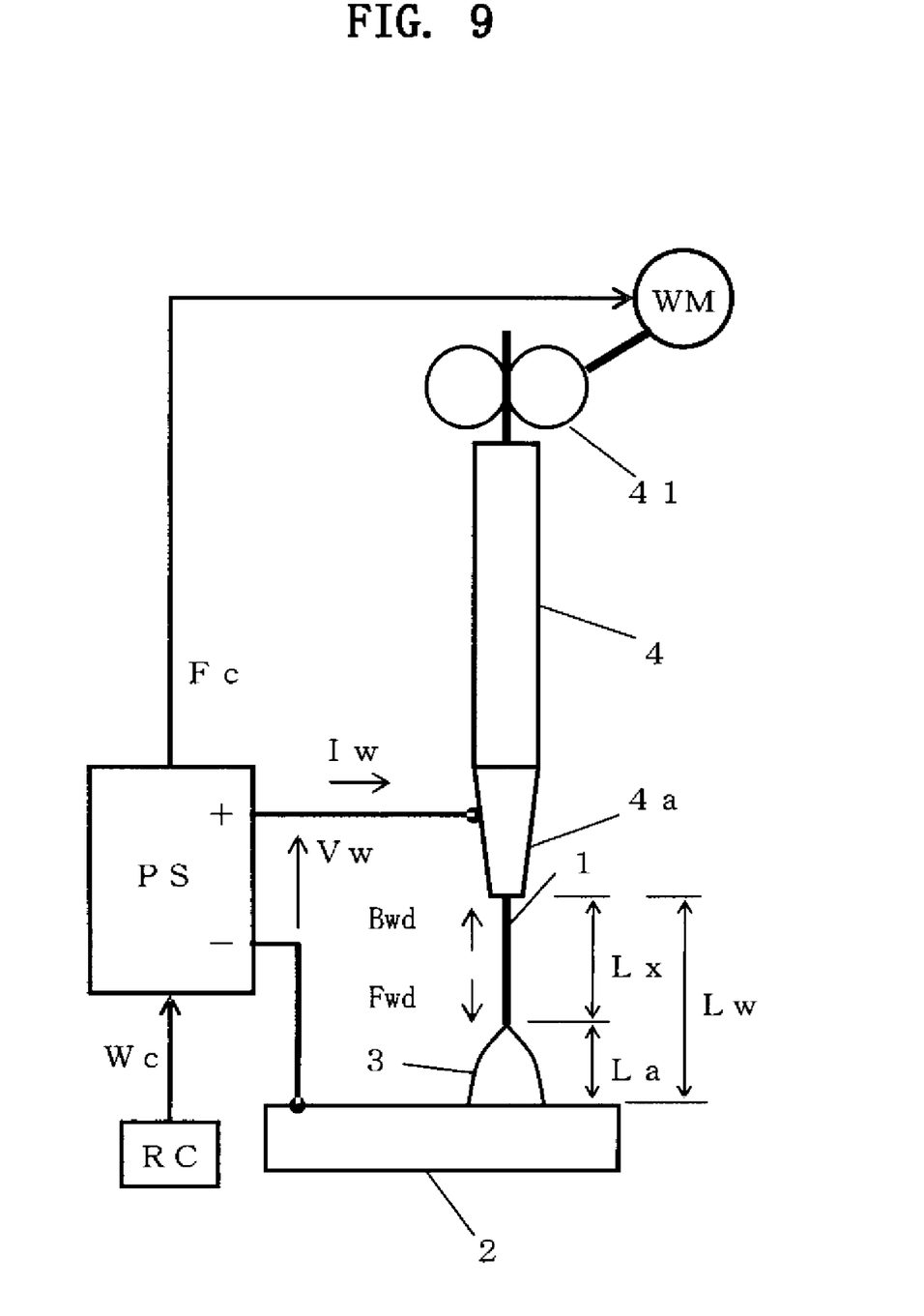
FIG. 9 is a configuration diagram of a typical conventional consumable electrode arc welding system which uses a welding robot.

FIG. 9 shows the configuration of a typical consumable electrode arc welding system utilizing a welding robot. The welding system includes components described below.

The conventional welding system is provided with a welding power source PS. As seen from the figure, the power source PS receives a welding condition signal Wc as an input from a robot controller RC, and then outputs welding voltage Vw and welding current Iw for arc generation. The power source PS also outputs a feed control signal Fc to a wire feeding motor WM for performing controlled feeding of a welding wire 1. The welding condition signal Wc from the robot controller RC includes a welding voltage setting signal and a welding current average setting signal, for example. The welding voltage setting signal is provided for setting the average of the welding voltage Vw, to serve as a signal for setting the length of an arc, as will be described later. The welding current average setting signal is converted to a wire feeding rate setting signal by the welding power source PS, for setting the wire feeding rate of the welding wire 1.

The welding wire 1 is fed through a welding torch 4 as the wire feeding motor WM drives feeding rollers 41. The welding wire 1 receives electric power via a power supply tip (contact tip) 4a for ignition of an arc 3. The welding torch 4 is supported by an unillustrated robot and can be moved in accordance with operation programs stored in the robot controller RC. Shielding gas is ejected from the tip of the welding torch 4 to shield the arc 3 and the welding spot on the base metal 2 from the surrounding air. In FIG. 9, the distance between the pointed end of the power supply tip 4a and the base metal 2 is depicted as a "tip-base distance" Lw (mm), the length of the arc 3 as an "arc length" La (mm), and the distance between the pointed end of the power supply tip 4a and the free end (the lower end in FIG. 9) of the welding wire 1 as a "wire extension" Lx (mm). As readily seen, these three quantities satisfy the relation Lw=Lx+La.

It is known that there is a standard value (reference value) for the tip-base distance Lw, depending on the average of a welding current Iw. For instance, the reference value is mm when the average of the welding current Iw is not greater than 200 A. Likewise, the reference value is 20 mm when the average is in a range of 200 through 300 A, and 25 mm when the average is not smaller than 300 A. In actual welding, a fine adjustment is made to the predetermined reference value of the tip-base distance Lw in accordance with the shape of a groove in the base metal. A tip-base distance Lw which is unduly smaller or greater than the reference value will cause unstable welding.

Figure 10:
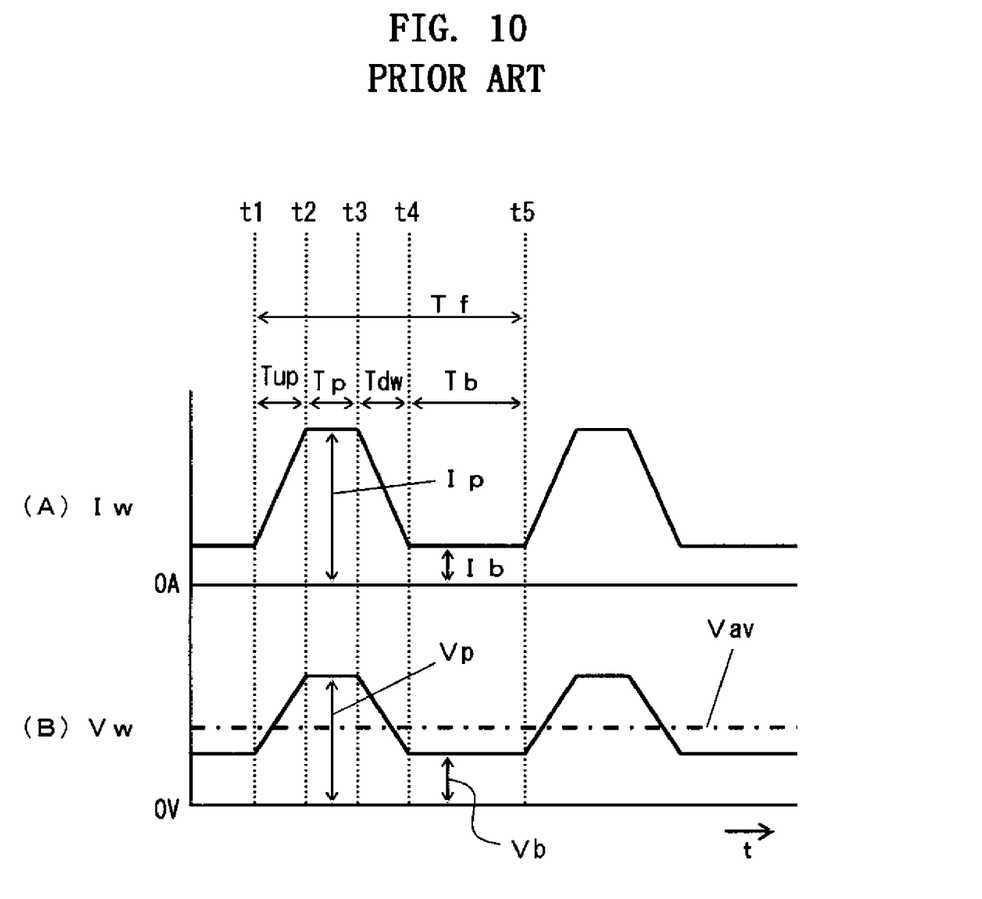
FIG. 10 is a current-voltage waveform chart in conventional consumable electrode pulse arc welding.

FIG. 10 is a current-voltage waveform chart in consumable electrode pulse arc welding. In the figure, (A) shows the welding current Iw whereas (B) shows the welding voltage Vw. From time t1 through time t2, i.e. during a peak rise time Tup, a transition current, rising from a base current Ib to a peak current Ip, is caused to flow, while a transition voltage, rising from a base voltage Vb to a peak voltage Vp, is applied across the power supply tip and the base metal. From time t2 through time t3, i.e. during a peak time Tp, a peak current Ip which is not smaller than a critical current value is caused to flow with a peak voltage Vp. From time t3 through time t4, i.e. during a peak fall time Tdw, a transition current, falling from the peak current Ip to the base current Ib, is caused to flow with a transition voltage falling from the peak voltage Vp to the base voltage Vb. From time t4 through time t5, i.e. during a base time Tb, a base current Ib, which is so small that a droplet will not grow on the welding wire, is caused to flow with a base voltage Vb. The total time period from time t1 through time t5 corresponds to one pulse cycle Tf.

The peak rise time Tup and the peak fall time Tdw are set to appropriate values in accordance with the material of the base metal. In pulse MAG welding in which the base metal is steel, the times Tup and Tdw are set to small values, so the peak current waveform is substantially square. On the other hand, in pulse MIG welding in which the base metal is aluminum, the times Tup and Tdw are set to large values, so the peak current waveform is trapezoidal. For improved welding performance, the rising/falling of the transition current may be performed in various patterns not only in a linear increase/decrease pattern but also in curved patterns (see JP-A-2005-28383 and JP-A-2006-75890, for example). Also, the peak current Ip may be increased in a stepped pattern (see JP-A-2005-118872, for example). The shielding gas may be provided by a mixture of 80% argon gas and 20% carbon dioxide gas for pulse MAG welding, while 100% argon gas may be used for pulse MIG welding.

In consumable electrode arc welding, it is important to keep the arc length at an appropriate value in order to achieve good welding quality. Since the average Vav of the welding voltage Vw is generally in proportion to the arc length, the above arc length control can be performed by controlling the output of the welding power source so that the welding voltage average Vav will be equal to a predetermined welding voltage setting value. Likewise, in pulse arc welding, the welding power source output is controlled by varying the pulse cycle Tf (frequency modulation control) so that the welding voltage average Vav will be equal to the welding voltage setting value. Another method of controlling the welding power source output is to fix the pulse cycle Tf as a constant, and vary the peak time Tp (pulse-width modulation control). The welding voltage average Vav used for the control is provided by the value obtained by smoothening the welding voltage Vw.

Figure 11:
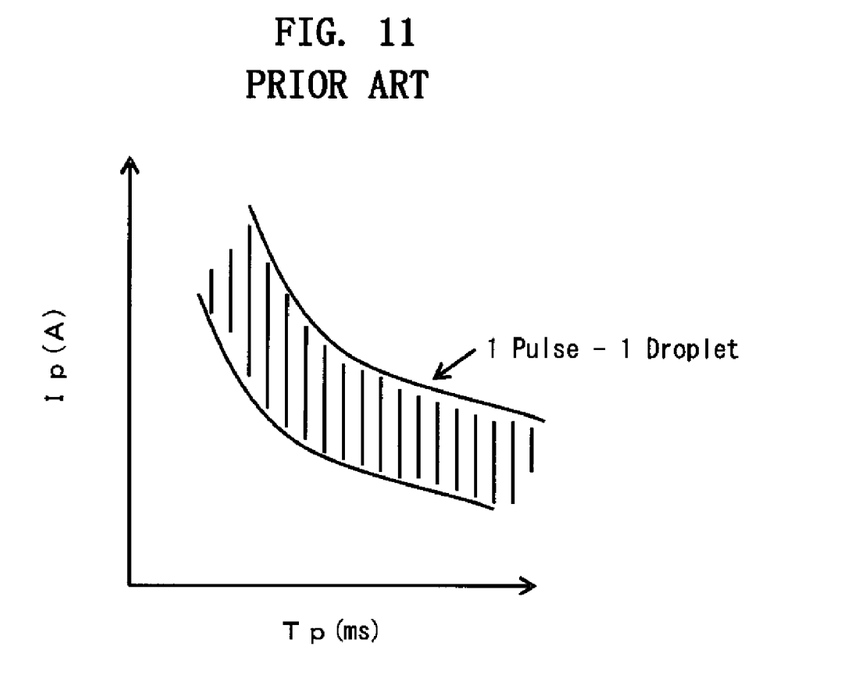
FIG. 11 is a 1 pulse-1 droplet transfer zone chart for illustrating how to set a peak time Tp and a peak current Ip in conventional welding.

FIG. 11 is a 1 pulse-1 droplet transfer zone chart, which shows how the specific values for the peak time Tp and the peak current Ip are to be set. In the figure, the horizontal axis indicates the peak time Tp (ms), while the vertical axis indicates the peak current Ip (A). The hatching indicates a zone of conditions to achieve a single droplet transfer in synchronization with the pulse cycle Tf (1 pulse-1 droplet transfer). When a set of conditions (called unit pulse conditions) of the peak time Tp and the peak current Ip fall within the hatched zone, 1 pulse-1 droplet transfer takes place. In actual welding, the unit pulse conditions are selected so that they are to fall within the 1 pulse-1 droplet transfer zone and also within a range by which a good bead shape (i.e. with proper bead appearance and no undercut) will result. When the peak current Ip is not constant, it is integrated over the peak time Tp, and the integrated current value is to fall within a certain range corresponding to the hatched zone. The unit pulse conditions may need to be set for individual cases since the 1 pulse-1 droplet transfer zone varies depending on various factors such as the kind of a welding wire, the shielding gas mixture ratio, and the wire feeding rate.

Figure 12:
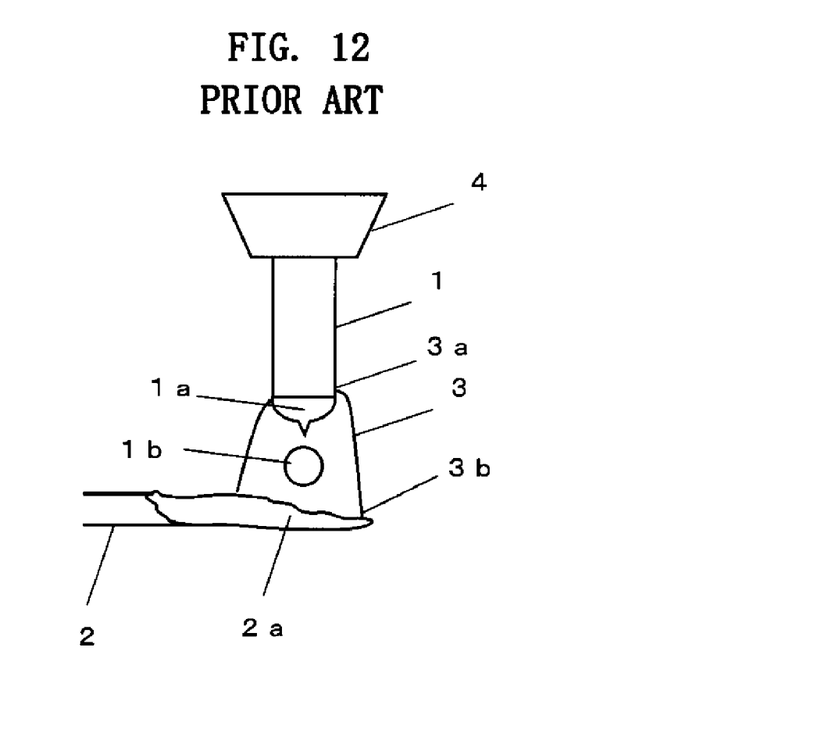
FIG. 12 illustrates the generation of an arc in conventional welding, with the unit pulse condition falling within the 1 pulse-1 droplet transfer zone.

FIG. 12 illustrates the spot where an arc is generated, with the unit pulse conditions falling in a range that enables 1 pulse-1 droplet transfer. Specifically, an arc is ignited between the welding wire 1 (fed from the tip of welding torch 4) and the base metal 2, and a molten pool 2a is formed in the base metal 2. An arc anode point 3a is in an upper portion of a droplet 1a on the wire tip. Thus, the droplet 1a is located in an envelope of the arc 3. An arc cathode point 3b, on the other hand, is on the molten pool 2a. The droplet 1b is separated from the welding wire 1 and transferred to the base metal 2 immediately after the application of the peak current Ip is over.

When the shielding gas mixture ratio is a standard value, the unit pulse conditions are selected so as to fall within the 1 pulse-1 droplet transfer zone and to provide a good bead shape, as noted above. In pulse MAG welding (the base metal is steel), for example, the shielding gas is a mixture of argon gas and carbon dioxide gas. In Japan, a typical mixture ratio of argon to carbon dioxide is 80% to 20%.

The shielding gas may be supplied in various ways. For example, the two kinds of gases may be premixed accurately to the predetermined ratio and filled into a gas cylinder, from which the shielding gas is supplied. In this case, there is virtually no fluctuations in the shielding gas mixture ratio, and the welding is performed with the fixed ratio. However, in a large-scale factory, argon gas and carbon dioxide gas may initially be stored in separate tanks, and mixed later to a required ratio by using a mixer. Thereafter, the mixed gas (shielding gas) is distributed to individual welding machines through a centralized piping system. In such a case, there is usually a certain period of time (in starting the day's operation early in the morning, for example) when the shielding gas mixture ratio is in initial fluctuation before it settles. The range of fluctuation, which may differ among shielding gas supply systems, can be large, such as ±5% through ±10%. In addition to the initial fluctuation, there may also be fluctuations during normal factory operation. The fluctuation range in this case may be smaller than that of the initial fluctuation, but it can still be about ±5%. In another case, the welding may be performed with the shielding gas mixture ratio being adjusted to a proper value, depending on the shape of work, the required welding quality, etc. In such high-quality welding, the shielding gas mixture ratio is preset by increasing or decreasing the percentage of the argon gas. For example, use may be made of a mixture of 90% argon gas and 10% carbon dioxide gas, or a mixture of 70% argon gas and 30% carbon dioxide gas.

When the shielding gas mixture ratio is changed by increasing the percentage of the argon gas, the arc may still remain undisturbed. This is because the droplet transfer is facilitated by increasing the ratio of the argon gas. Thus, it is often unnecessary to reset the unit pulse condition even when the argon gas ratio is changed to increase.

On the other hand, when the argon gas ratio in the shielding gas is changed to decrease, the arc becomes unstable because the droplet transfer will not readily occur, as described below with reference to FIG. 13.

Figure 13:
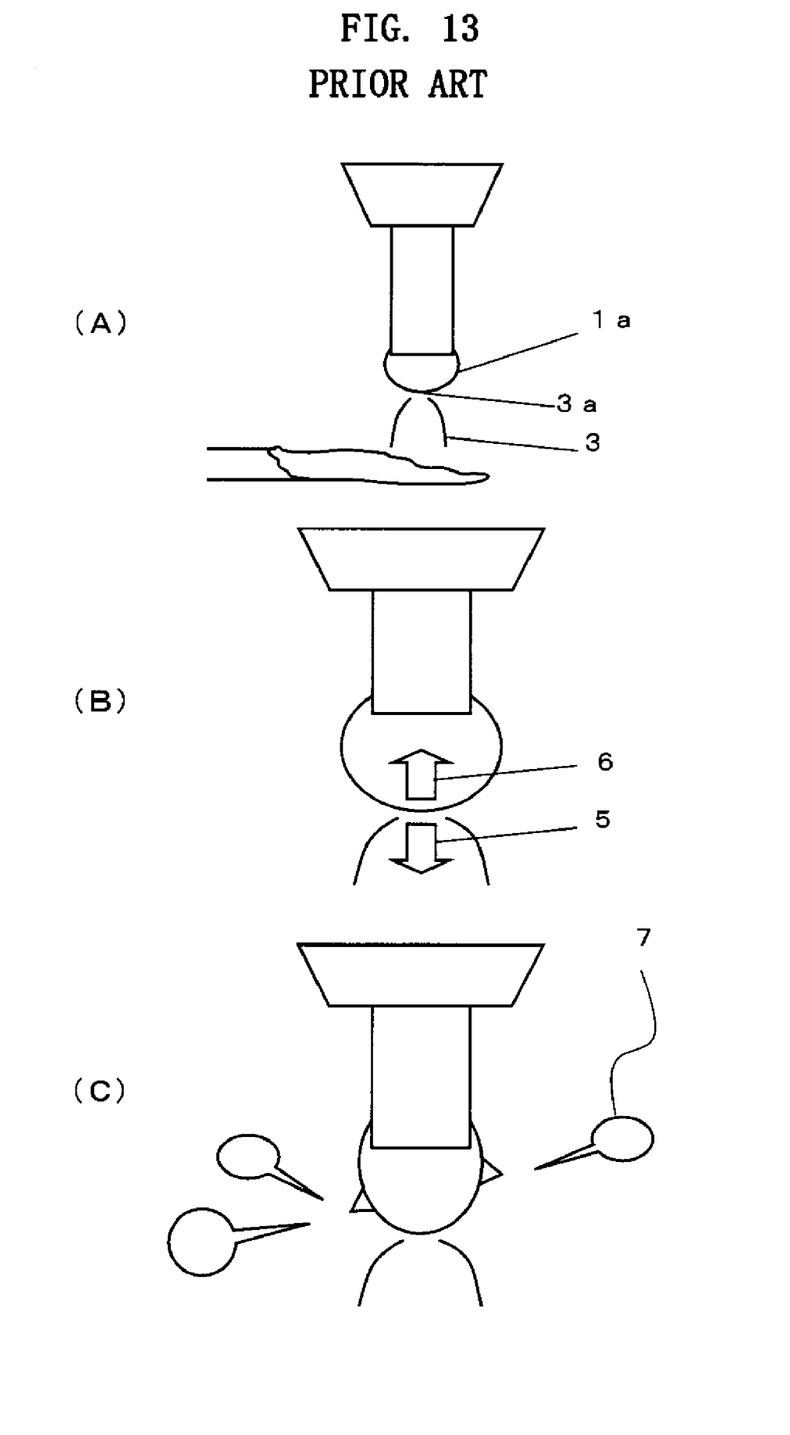
FIG. 13 illustrates the generation of an arc in conventional welding, with the argon gas ratio reduced below a standard ratio.

In FIG. 13, the generation of an arc is illustrated as three stages (A)-(C), in a case where the argon gas ratio in the shielding gas is reduced below the standard ratio. A droplet transfer proceeds in the order indicated by stages (A), (B) and (C). Specifically, with the argon gas ratio reduced, an arc anode point 3a is located at a lower end of the droplet 1a (stage (A)). In this state, the temperature at and around the arc anode point 3a becomes extremely high. Hence, metal vapor 5 blasts downward from the lower end of the droplet 1a (stage (B)), and as a reaction, the droplet 1a on the welding wire receives an upward pushing force 6 from the metal vapor 5, which makes the state of the droplet 1a unstable. Then, with the upward pushing force 6 preventing a droplet transfer (in particular, 1 pulse-1 droplet transfer) from occurring, the droplet 1a grows unduly big and spatters in a great amount, not only downward from the wire but also in undesired directions, as indicated by numeral 7 (stage (C)).

One way to address the above-described problem may be to move the arc anode point 3a from the lower end of the droplet 1a to an upper portion thereof, by increasing the peak current Ip. In this manner, though the arc anode point 3a is moved upward to an upper portion of the droplet 1a, the arc 3 will unduly flare and the arc force will increase. Accordingly, a number of undercuts will be produced, and the bead appearance will deteriorate. In addition, the increased arc force will produce more spatters from the molten pool.

The above-described problem arises when the shielding gas mixture ratio varies. Another problem comes up when the tip-base distance is changed from the reference value. As noted above, the unit pulse conditions are so selected as to fall within a predetermined range for ensuring proper droplet transfer, good bead appearance and so forth, on the premise that the tip-base distance is kept at the reference value. In such an instance, actually there may be a small deviation in the tip-base distance from the reference value. However, when the deviation is about ±3 mm or less, the welding condition does not significantly deteriorate, and thus the unit pulse condition does not need to be readjusted. However, the deviation is over ±3 mm (for example, about ±5 mm), the welding condition will unduly deteriorate.

SUMMARY OF THE INVENTION

It is therefore an object of the present invention to provide a pulse arc welding method which ensures a stable arc condition, even when the shielding gas mixture ratio and the tip-base distance are changed.

According to a first aspect of the present invention, there is provided a pulse arc welding method for performing welding by causing welding current to flow through a welding wire and a base metal via a power supply tip so that an arc is ignited between the welding wire and the base metal, and the arc causes a molten droplet to transfer from the welding wire and the base metal. The welding current has a pulse cycle made up of a first peak time, a second peak time and a base time. The method includes the steps of: applying a first peak current during the first peak time; applying a second peak current during the second peak time, the second peak current being smaller than the first peak current; and applying a base current during the base time. When a tip-base distance between an end of the power supply tip and the base metal is smaller than a reference value, the first peak current is increased in accordance with a difference between the reference value and the tip-base distance.

According to a second aspect of the present invention, when the above-noted tip-base distance is greater than the reference value, the second peak current is reduced in accordance with a difference between the reference value and the tip-base distance.

Other features and advantages of the present invention will become more apparent from detailed description given below with reference to the accompanying drawings.

DETAILED DESCRIPTION OF THE PREFERRED EMBODIMENTS

Figure 1:
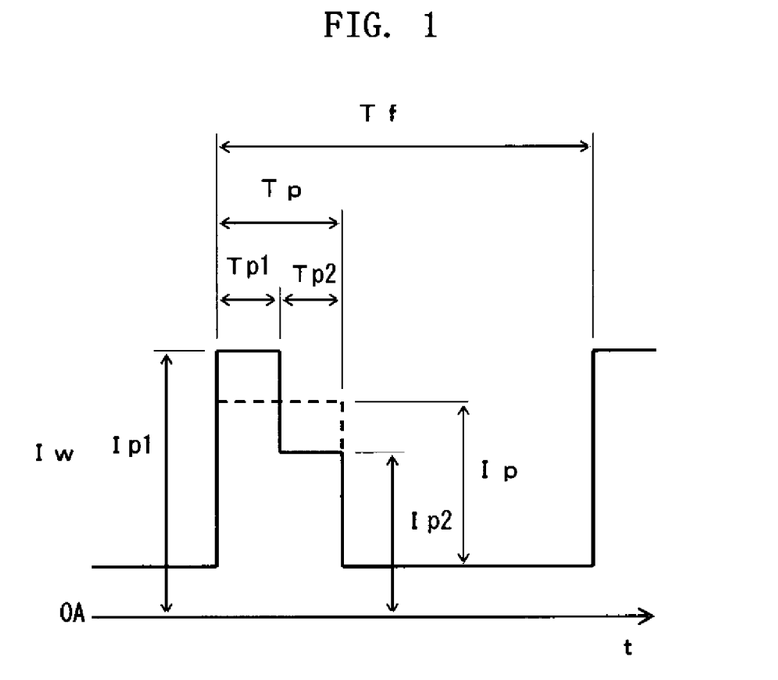
FIG. 1 is a waveform chart of a welding current Iw in a pulse arc welding method according to a first embodiment.

FIG. 1 shows the waveform of a welding current Iw in a pulse arc welding method according to a first embodiment of the present invention. As shown in the figure, a peak time Tp is made up of two consecutive periods of times, i.e. a first peak time Tp1 and a second peak time Tp2 that follows the first peak time Tp1 without any interruptions. During the first peak time Tp1, a first peak current Ip1 is applied to flow through a welding wire and a base metal, while during the second peak time Tp2, a second peak current Ip2 is applied, which is smaller in value than the first peak current Ip1. Thus, the peak time current as a whole has a step-like form, with the right-hand part reduced below the left-hand part.

As indicated in broken lines in FIG. 1, the conventional peak time current is fixed to have a constant value Ip. The first peak current Ip1 is greater than the constant value Ip. The application of the first peak current Ip1 in the first peak time Tp1 contributes to positioning an arc anode point at an upper portion of a droplet, even when the shielding gas mixture ratio is changed. More specifically, since the first peak current value Ip1 is greater than the conventional peak current value Ip, an arc anode point is to locate at an upper portion of the droplet even when the ratio of argon in the shielding gas is reduced. To achieve the desired positioning of an arc anode point, the first peak time Tp1 needs to last for about 0.2 through 1.0 ms, for example. Thus, during the first peak time Tp1, preferably the first peak current Ip1 remains at the same value, rather than reduces with time. The first peak current Ip1 needs to be great enough to ensure that the arc anode point is always at the upper portion of the droplet, even when the shielding gas mixture ratio maximally fluctuates within the predetermined range. Such a first peak current Ip1 can be determined in the following manner. First, an experiment is conducted to find the minimum value of currents ensuring that the arc anode point is always at the upper portion of the droplet even when the shielding gas mixture ratio maximally fluctuates within the predetermined range. Then, a safety margin (10~50A, for example) is added to the experimentally obtained minimum value. The result (=the minimum value+ the safety margin) is adopted as the value of the first peak current Ip1. It should be noted here that the first peak current value Ip1 could be set to any higher value than the experimentally obtained minimum value, if the only consideration were the positioning of the arc anode point relative to the droplet. However, if the first peak current value Ip1 is too large, the resultant arc force will also be large enough to produce spatters and undercuts. In light of this, it is preferable that the first peak current value Ip1 is set to the above-noted sum, i.e. the experimentally obtained minimum value+the safety margin.

The second peak current Ip2 to flow during the second peak time Tp2 is set to a smaller value than both the conventional peak current Ip and the first peak current Ip1 of the present invention. The arc anode point does not move from the upper portion of the droplet even after the process changes to the second peak time Tp2. This is because the arc anode point, once located, tends to remain stable at the initial position, even when the welding current is decreased. In addition, since the second peak current Ip2 is set to a smaller value than the conventional peak current Ip, the average current over the entire peak time Tp is substantially equal to the conventional current average. Accordingly, the arc shape and the arc force are substantially the same as those by the conventional method, thereby contributing to producing good bead appearance with no undercuts.

The above-noted criteria for setting the parameters are summarized as follows. The setting of the parameters is performed when the tip-base distance is at a reference value.

(1) The first peak time Tp1 and the first peak current Ip1 are set so that the arc anode point is present at an upper portion of the droplet regardless of an initially estimated variation of the shielding gas mixture ratio.

(2) The second peak time Tp2 and the second peak current Ip2 are set so that a 1 pulse-1 droplet transfer occurs and good bead appearance with no undercuts is produced.

When the tip-base distance becomes smaller than the reference value, the wire extension is reduced by the arc length control so that the arc length is maintained substantially constant. Heat input for droplet formation comes from the arc heat and Joule heat at the extending portion of the wire. Thus, the decrease in the wire extension results in decrease in Joule heat, and therefore decrease in the heat input for droplet formation, which will hinder a proper droplet transfer. Consequently, the base metal may come into contact with the wire tip which has not sufficiently melted, whereby more spatters will be produced and the arc will be unduly broken. These problems occur more frequently as the tip-base distance becomes smaller. According to the present invention, these problems are overcome by performing the following control. When the tip-base distance Lw becomes smaller than the reference value Lt, the distance difference $\Delta L=Lt-Lw$ is calculated. Then, using the distance difference $\Delta L$ as an input, a first peak current correction $\Delta Ip1=f(\Delta L)$ is calculated, based on a predetermined first peak current correction calculation function f. Then, the first peak current value Ip1 is increased by the first peak current correction $\Delta Ip1$. The first peak current correction calculation function f will be described later in detail with reference to FIGS. 2 and 3.

The above-noted increasing of the first peak current value Ip1 in response to the tip-base distance Lw below the reference value provides the following advantages. First, the increased first peak current value Ip1 compensates for the decrease in Joule heat caused by the decrease in the tip-base distance Lw. Thus, appropriate heat input for formation of a droplet is ensured, and a proper droplet transfer will occur. Second, by increasing the first peak current value Ip1, which is the first part of the peak current, a greater arc force acts on the molten pool, producing a depression in the molten pool. As a result, it is possible to prevent the short-circuiting from occurring when the tip-base distance Lw reduces.

In light of the above, according to the present invention, stable welding is ensured even when the tip-base distance Lw reduces. Also, by increasing the first peak current value Ip1, the arc anode point can be positioned at an upper portion of the droplet.

Instead of increasing only the first peak current Ip1, it is possible to increase both the first peak current Ip1 and the second peak current Ip2. This may not be preferable, however, since the arc will be wider, and hence undercuts are more likely to be produced. It is also possible to increase only the second peak current Ip2, while the first peak current Ip1 is maintained. This arrangement, however, may not be preferable either, since the arc force will become weaker, thereby failing to make an appropriate depression in the molten pool.

Figure 2:
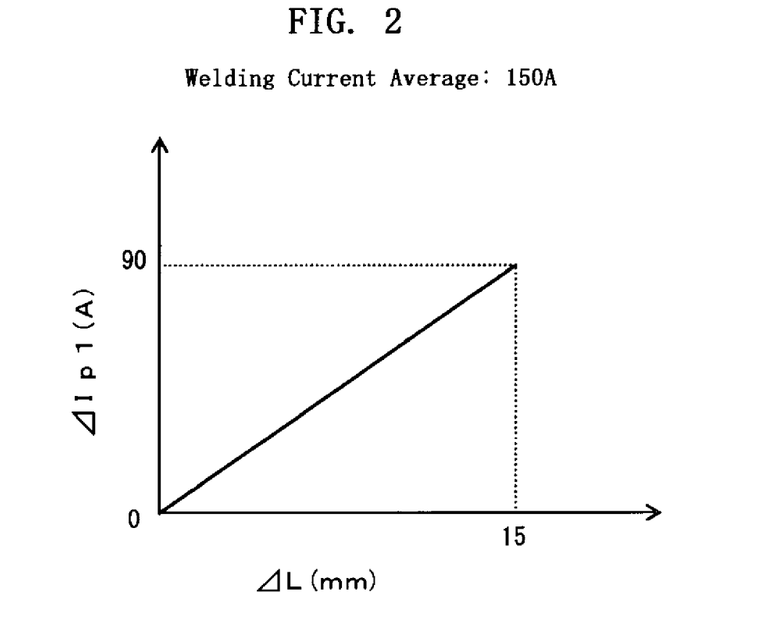
FIG. 2 shows a first peak current correction calculation function f according to the first embodiment.

FIG. 2 shows an example of the above-mentioned first peak current correction calculation function f. In FIG. 2, the horizontal axis indicates distance difference $\Delta L$ (mm) whereas the vertical axis indicates first peak current correction $\Delta Ip1$ (A). Welding conditions in this case are: steel welding wire of a 1.2 mm diameter; shielding gas provided by a mixture of 80% argon gas and 20% carbon dioxide gas; welding current average of 150 A; welding voltage average of 24.0 V; wire feeding rate of 4.7 m/min; tip-base distance reference value Lt of 15 mm; first peak current Ip1 of 480 A; first peak time Tp1 of 0.7 ms; second peak current Ip2 of 440 A; and second peak time Tp2 of 0.7 ms.

The distance difference $\Delta L$ indicated by the horizontal axis ranges from 0 through 15 mm. Correspondingly, the first peak current correction $\Delta Ip1$ indicated by the vertical axis varies from 0 through 90 A. When $\Delta L<0$ (meaning that the tip-base distance Lw is greater than the reference value Lt), $\Delta Ip1=0$ (A). When $\Delta L=0$ mm, i.e. when the tip-base distance Lw is equal to the reference value Lt, then $\Delta Ip1=0$ A and so the first peak current value Ip1=480 A. When $\Delta L=5$ mm, i.e. when the tip-base distance Lw=10 mm, then $\Delta Ip1=30$ A and so the first peak current value Ip1=510 A. When $\Delta L=10$ mm, i.e. when the tip-base distance Lw=5 mm, then $\Delta Ip1=60$ A and so the first peak current value Ip1=540 A. These are in a practical range which is used in actual applications.

Figure 3:
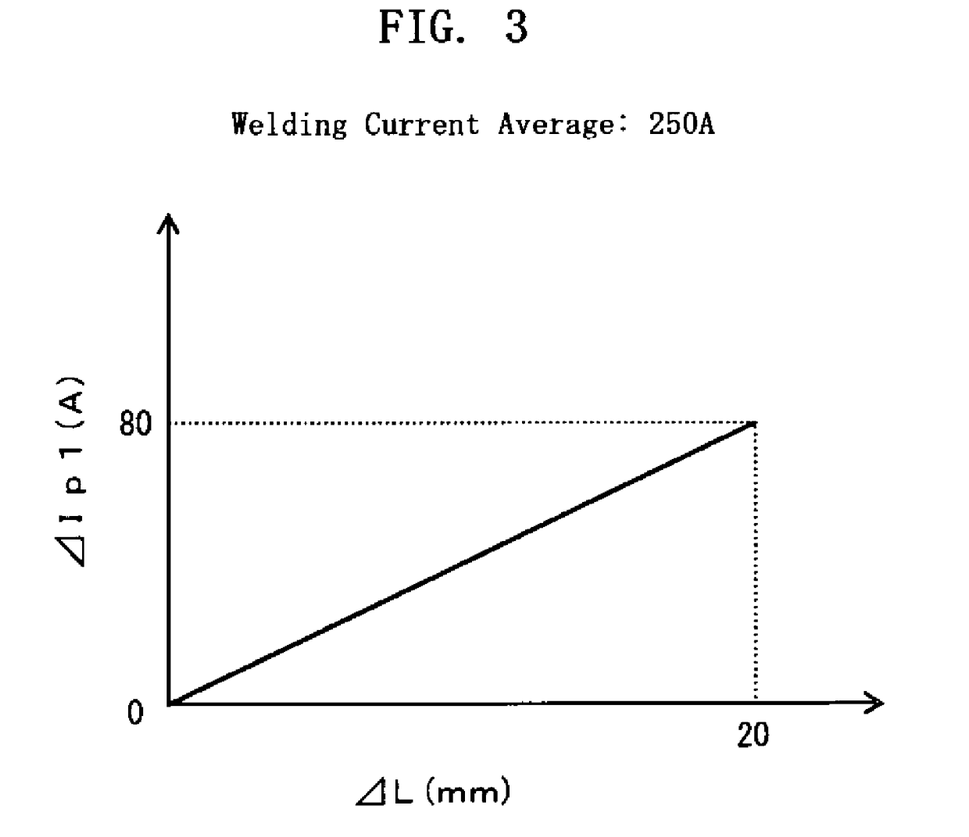
FIG. 3 shows another example of the first peak current correction calculation function f, which is different from the one in FIG. 2, according to the first embodiment.

FIG. 3 shows another example of the first peak current correction calculation function f, which is different from the one in FIG. 2. In FIG. 3 again, the horizontal axis indicates distance difference $\Delta L$ (mm) whereas the vertical axis indicates first peak current correction $\Delta Ip1$ (A). Welding conditions in this case are: welding current average of 250 A; welding voltage average of 26.5 V; wire feeding rate of 8.4 m/min; tip-base distance reference value Lt of 20 mm; first peak current Ip1 of 500 A; first peak time Tp1 of 0.7 ms; second peak current Ip2 of 460 A; and second peak time Tp2 of 0.7 ms. The other welding conditions (welding wire and shielding gas) are the same as those in the case of FIG. 2. It should be noted in this case that the welding current average is changed from 150 A to 250 A.

The distance difference $\Delta L$ indicated by the horizontal axis ranges from 0 through 20 mm. Correspondingly, the first peak current correction $\Delta Ip1$ varies within a range of 0 through 80 A. When $\Delta L<0$ (when the tip-base distance Lw is greater than the reference value Lt), then $\Delta Ip1=0$ A. When $\Delta L=0$ mm, i.e. when the tip-base distance Lw is equal to the reference value Lt, then $\Delta Ip1=0$ A and so the first peak current value Ip1=500 A. When $\Delta L=10$ mm, i.e. when the tip-base distance Lw=10 mm, then $\Delta Ip1=40$ A and so the first peak current value Ip1=540 A. When $\Delta L=15$ mm, i.e. when the tip-base distance Lw=5 mm, then $\Delta Ip1=60$ A and so the first peak current value Ip1=560 A. These are in a practical range which is used in actual applications.

Figure 4:
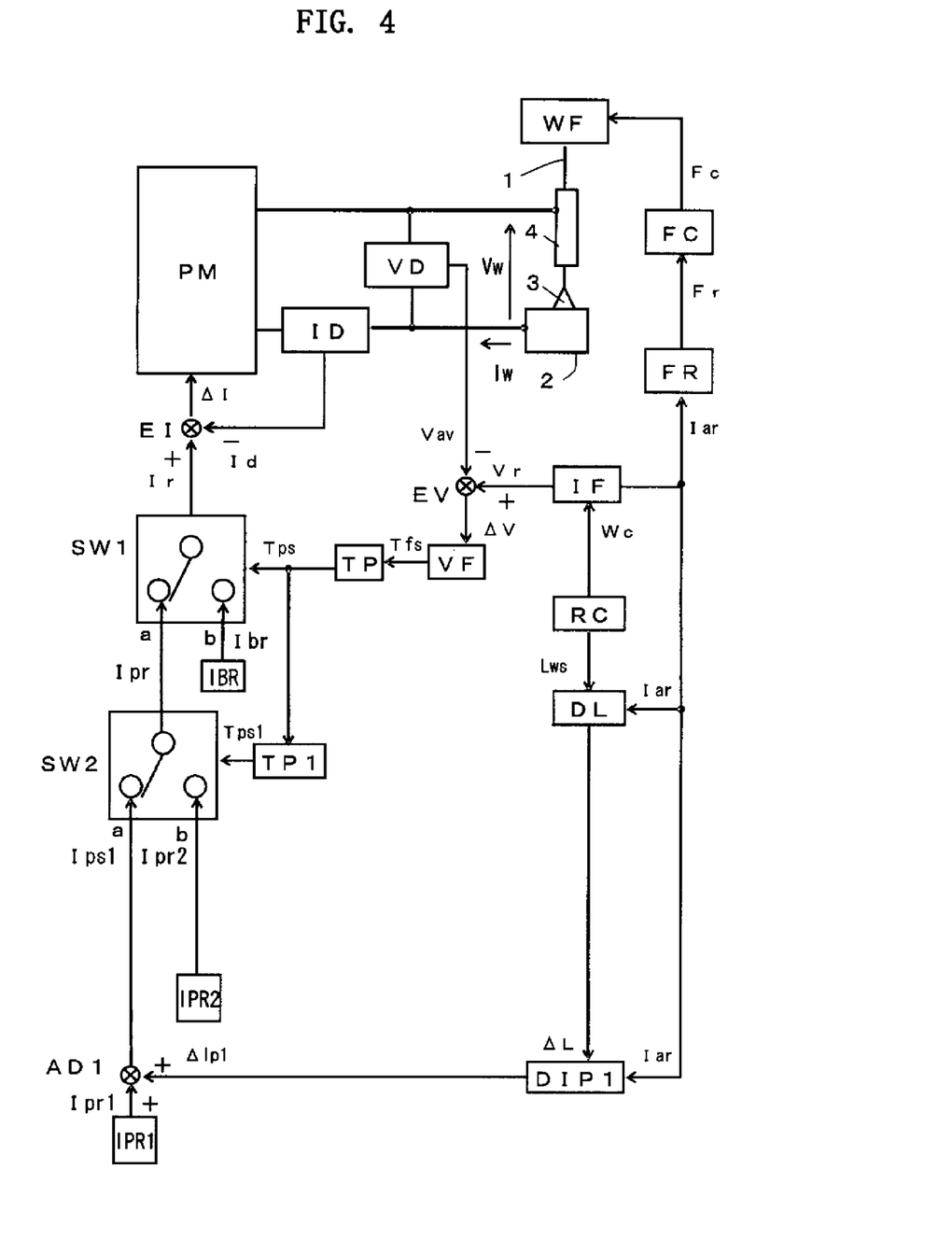
FIG. 4 is a block diagram of a welding power source for implementing the pulse arc welding method according to the first embodiment.

FIG. 4 is a block diagram of a welding power source for implementing the pulse arc welding method according to The first embodiment. Each of the blocks will be described below with reference to the figure.

A power source main circuit PM receives a commercially available power such as three-phase 200 volts as an input, performs an output control such as inverter control in accordance with a current error amplification signal $\Delta I$ (to be described later), and outputs welding voltage Vw and welding current Iw. The power source main circuit PM includes, for example, a primary rectifier which rectifies the commercial power supply, a smoothing capacitor which smoothens the rectified DC output, an inverter circuit which converts the smoothened DC to high frequency AC, a high frequency transformer which lowers the voltage of the high frequency AC to a value appropriate for arc welding, a secondary rectifier which rectifies the low-voltage high-frequency AC, a reactor which smoothens the rectified DC, a modulator circuit which receives the current error amplification signal $\Delta I$ as an input and performs a pulse-width modulation control, and a drive circuit which drives the above-described inverter circuit based on the modulated signal resulting from the pulse-width modulation. An interface circuit IF receives a welding condition signal Wc as an input from the robot controller RC, and outputs component signals contained in the welding condition signal Wc; namely, a welding voltage setting signal Vr, a welding current average setting signal Iar and a tip-base distance signal Lws. The tip-base distance signal Lws is calculated by an operation program stored in the robot controller RC, and sent to the welding power source. A feeding rate setting circuit FR receives the above welding current average setting signal Iar as an input, and outputs a wire feeding rate setting signal Fr accordingly to the value of the inputted signal. A feed control circuit FC receives this wire feeding rate setting signal Fr as an input, and outputs a feed control signal Fc. A wire feeder WF receives this feed control signal Fc as an input and drives a wire feeding motor based on the inputted signal for supplying the welding wire 1. The welding wire 1 is fed by the wire feeder WF through the welding torch 4. An arc 3 is ignited between the wire 1 and the base metal 2 for welding.

A voltage detection circuit VD detects the welding voltage Vw, calculates an average of the detected voltage, and outputs a voltage detection signal Vav. A voltage error amplification circuit EV amplifies an error between the welding voltage setting signal Vr and the voltage detection signal Vav, and outputs a voltage error amplification signal $\Delta V$. A voltage/frequency conversion circuit VF performs frequency conversion in accordance with the voltage error amplification signal $\Delta V$, and outputs a pulse cycle signal Tfs which assumes High level instantaneously every pulse cycle Tf (described above with reference to FIG. 1).

A peak-time timer circuit TP outputs a peak time signal Tps which assumes High level for a predetermined peak time Tp (see FIG. 1), which starts from the time when the above-described pulse cycle signal Tfs assumes High level. A base current setting circuit IBR outputs a predetermined base current setting signal Ibr. A first switching circuit SW1 switches to a side "a" when the peak time signal Tps is in High level (peak time), and outputs a peak current setting signal Ipr (to be described later) as a current setting signal Ir, while switching to a side "b" when the signal is Low level (base time) to output the above-described base current setting signal Ibr as the current setting signal Ir.

A first peak-time timer circuit TP1 outputs a first peak time signal Tps1 which assumes High level for a predetermined first peak time Tp1, which starts from the time when the peak time signal Tps assumes High level (peak time). A first peak current setting circuit IPR1 outputs a predetermined first peak current setting signal Ipr1, correspondingly to the case where the tip-base distance is equal to the reference value. A distance difference calculation circuit DL receives the above-described tip-base distance signal Lws and welding current average setting signal Iar as inputs, subtracts the tip-base distance signal Lws from a reference value Lt which corresponds to the welding current average setting signal Iar, and outputs a distance difference signal $\Delta L=Lt-Lws$. Thus, when the distance difference signal $\Delta L$ is equal to 0, the tip-base distance is equal to the reference value, when the distance difference signal $\Delta L$ is positive, the tip-base distance is smaller than the reference value and when the distance difference signal $\Delta L$ is negative, the tip-base distance is greater than the reference value. A first peak current correction calculation circuit DIP1 receives the distance difference signal $\Delta L$ and the welding current average setting signal Iar as inputs, and calculates a first peak current correction signal $\Delta Ip1$, based on a first peak current correction calculation function f (see FIG. 2 and FIG. 3, for example) depending on the welding current average setting signal Iar. It should be noted that the first peak current correction calculation function f gives an output of 0 when the inputted distance difference signal $\Delta L$ is negative. Thus, the first peak current correction signal $\Delta Ip1$ is positive when the tip-base distance is smaller than the reference value, while it is equal to 0 when the tip-base distance is greater than the reference value. A first addition circuit AD1 indicated by a small circle adds the first peak current setting signal Ipr1 and the first peak current correction signal $\Delta Ip1$, and outputs a first peak current correction setting signal Ips1. A second peak current setting circuit IPR2 outputs a second peak current setting signal Ipr2 predetermined correspondingly to the case where the tip-base distance is equal to the reference value. A second switching circuit SW2 switches to a side "a" when the first peak time signal Tps1 assumes High level (the first peak time), and outputs the first peak current correction setting signal Ips1 as the peak current setting signal Ipr, while outputting the second peak current setting signal Ipr2 as the peak current setting signal Ipr when the first peak time signal Tps1 assumes Low level (the second peak time).

An electric current detection circuit ID detects the welding current Iw and outputs a current detection signal Id. A current error amplification circuit EI amplifies an error between the current setting signal Ir and the current detection signal Id, and outputs a current error amplification signal $\Delta I$. Through these circuit blocks, the welding current Iw described above with reference to FIG. 1 is provided.

According to the first embodiment described above, it is possible, by the application of the first peak current and the second peak current, to position the arc anode point at an upper portion of the droplet, and thereby to prevent the widening of the arc and the increase in the arc force, even if the shielding gas mixture ratio varies from the standard ratio within a predetermined range. This enables a 1 pulse-1 droplet transfer and undercut reduction, which contributes to maintaining a stable arc and providing high quality welding.

Further, when the tip-base distance becomes smaller than the reference value, the first peak current is reduced, so that the droplet transfer is stabilized and short-circuiting is prevented. In this manner, high quality welding is provided even when the tip-base distance becomes small.

The second embodiment of the present invention will now be described below.

According to the second embodiment, the welding current Iw (FIG. 1) described above in the first embodiment is also applied, and in addition, a control is performed for stabilizing the welding condition even when the tip-base distance becomes greater than the reference value.

Specifically, when the tip-base distance becomes greater than the reference value, the arc length control is conducted so as to maintain the arc length, and for this purpose the wire extension is made greater. Heat input for droplet formation comes from the arc heat and Joule heat at the extending portion of the wire. Accordingly, a greater wire extension leads to increased Joule heat and increased heat input for droplet formation, and excessive heat input may hinder a proper droplet transfer. This problem becomes more significant as the tip-base distance becomes greater. In order to overcome this problem, according to the second embodiment, the following control is conducted. When the tip-base distance Lw has become greater than the reference value Lt, a calculation is made for a distance difference $\Delta L=Lt-Lw$, and based on this distance difference $\Delta L$ as an input, a second peak current correction $\Delta Ip2=g(\Delta L)$ is calculated by a predetermined second peak current correction calculation function g, and then the second peak current value Ip2 is reduced by an amount of the second peak current correction $\Delta Ip2$. The second peak current correction calculation function g will be described later with reference to FIG. 5 and FIG. 6.

The reduction of the second peak current value Ip2 when the tip-base distance Lw becomes greater than the reference value provides the following advantages. The amount of increase in Joule heat caused by the increased length of the tip-base distance Lw is reduced by decreasing the second peak current value Ip2. This reduces increase in the heat input for droplet formation, and leads to a proper droplet transfer. Since the first peak current value Ip1 remains constant, the advantage of positioning the arc anode point at an upper portion of the droplet is still enjoyed.

Instead of decreasing only the second peak current Ip2, it may be possible to decrease both the first peak current Ip1 and the second peak current Ip2. This may not be preferable, however, since this will lead to loss of the advantage that the arc anode point can be positioned at an upper portion of the droplet even if the shielding gas mixture ratio varies. It may not be preferable either to decrease the first peak current Ip1 instead of the second peak current Ip2.

Figure 5:
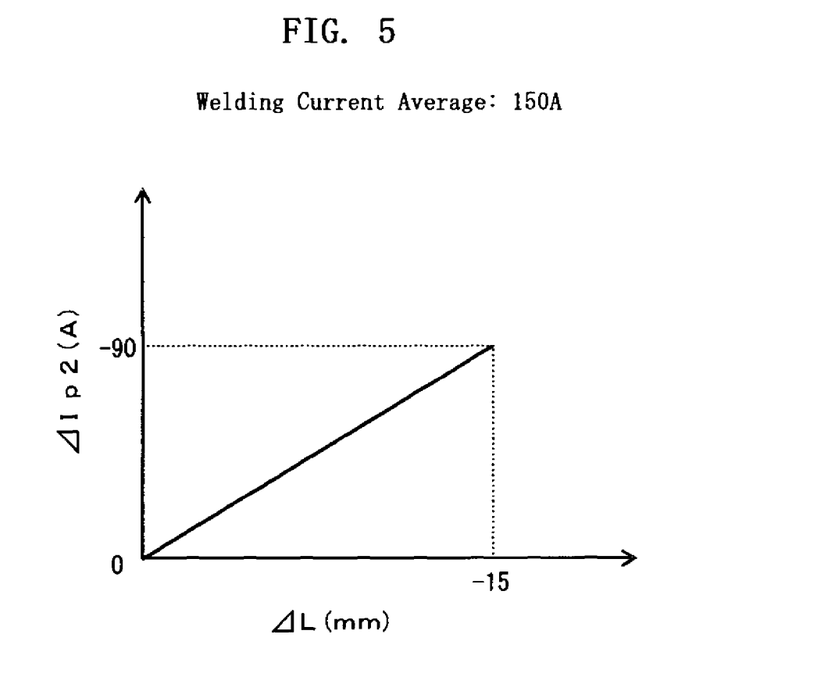
FIG. 5 shows a second peak current correction calculation function g according to a second embodiment.

FIG. 5 shows an example of the second peak current correction calculation function g mentioned above. In FIG. 5, the horizontal axis indicates the distance difference $\Delta L$ (mm) whereas the vertical axis indicates the second peak current correction $\Delta Ip2$ (A). FIG. 5 shows a case where the welding current average is 150 A, and the same welding conditions as those described above with reference to FIG. 2 hold. Since the distance difference $\Delta L=Lt-Lw$, the relation $\Delta L<0$ holds when the tip-base distance Lw is greater than the reference value Lt. The second peak current correction $\Delta Ip2$ also takes a negative value, and the addition of the negative value decreases the second peak current value Ip2.

The distance difference $\Delta L$ ranges from −15 through 0 mm. Correspondingly, the second peak current correction Ip2 varies within a range of −90 through 0 A. When $\Delta L>0$ (the tip-base distance Lw is smaller than the reference value Lt), then ΔIp2=0 A. Also, when ΔL<−15 mm, then ΔIp2=−90 A. When ΔL=0 mm, i.e. when the tip-base distance Lw is equal to the reference value Lt, then ΔIp2=0 A and so the second peak current value Ip2=440 A. When ΔL=−5 mm, i.e. when the tip-base distance Lw=20 mm, then ΔIp2=−30 A and so the second peak current value Ip2=410 A. When ΔL=−10 mm, i.e. when the tip-base distance Lw=25 mm, then ΔIp2=−60 A and so the second peak current value Ip2=380 A. These are in a practical range which is used in actual applications.

Figure 6:
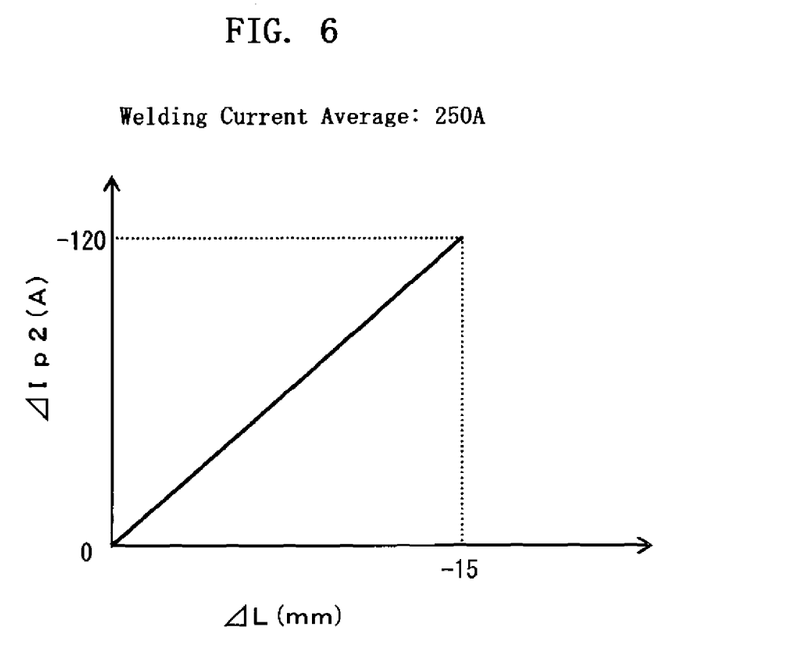
FIG. 6 shows another example of the second peak current correction calculation function g, which is different from the one in FIG. 5, according to the first embodiment.

FIG. 6 shows another example of the second peak current correction calculation function g which is different from the one in FIG. 5 described above. In FIG. 6 again, the horizontal axis indicates the distance difference ΔL (mm) whereas the vertical axis indicates the second peak current correction ΔIp2 (A). Both the horizontal axis and the vertical axis show a negative value range. FIG. 6 shows a case where the welding current average is 250 A, the same welding conditions as those described above with reference to FIG. 3 hold.

The distance difference ΔL ranges from −15 through 0 mm. Correspondingly, the second peak current correction ΔIp2 varies within a range of −120 through 0 A. When ΔL>0 (the tip-base distance Lw is smaller than the reference value Lt), then ΔIp2=0 A. When ΔL<−15 mm, then ΔIp2=−120 A. When ΔL=0 mm, i.e. when the tip-base distance Lw is equal to the reference value Lt=20 mm, then ΔIp2=0 A and so the second peak current value Ip2=460 A. When ΔL=−10 mm, i.e. when the tip-base distance Lw=30 mm, then ΔIp2=−80 A and so the second peak current value Ip2=380 A. When ΔL=−15 mm, i.e. when the tip-base distance Lw=35 mm, then ΔIp2=−120 A and so the second peak current value Ip2=340 A.

Figure 7:
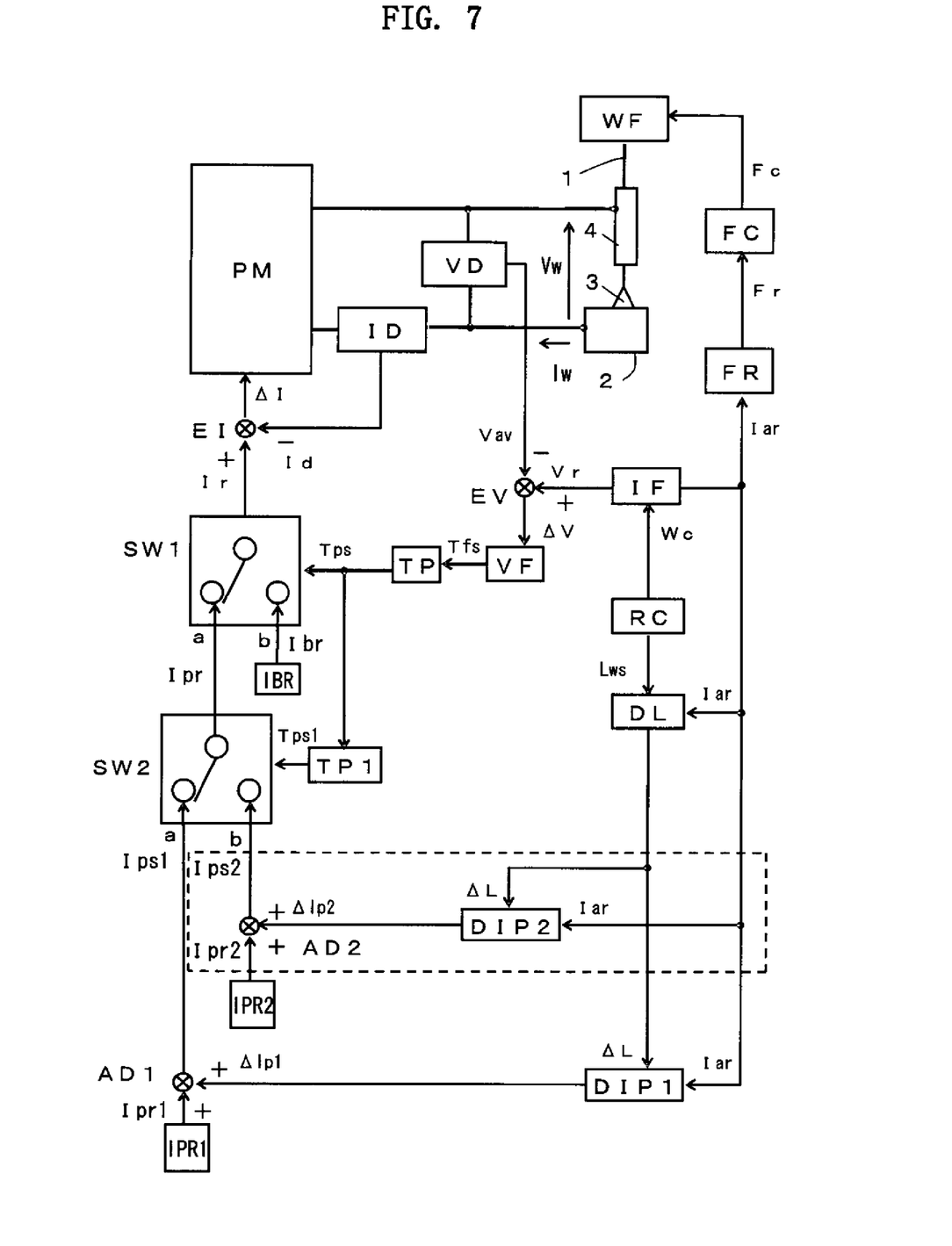
FIG. 7 is a block diagram of a welding power source for implementing the pulse arc welding method according to the second embodiment.

FIG. 7 is a block diagram of a welding power source for implementing the pulse arc welding method according to the second embodiment. In the figure, blocks which are identical or similar to those in FIG. 4 are indicated by the same reference symbols. FIG. 7 is essentially the same as FIG. 4, except for added components, i.e. a second peak current correction calculation circuit DIP2 and a second addition circuit AD2 drawn in broken lines.

The second peak current correction calculation circuit DIP2 receives the distance difference signal ΔL and the welding current average setting signal Iar as inputs, and calculates a second peak current correction signal ΔIp2 based on a first peak current correction calculation function g (e.g. FIG. 5 and FIG. 6) which is predetermined in accordance with the welding current average setting signal Iar. It should be noted that the second peak current correction calculation function g gives an output of 0 when the distance difference signal ΔL is positive. Thus, the second peak current correction signal ΔIp2 has a negative value when the tip-base distance is greater than the reference value while it has a value of 0 when the distance is smaller than the reference value. The second addition circuit AD2 indicated by a small circle adds the second peak current setting signal Ipr2 and the second peak current correction signal ΔIp2, and outputs a second peak current correction setting signal Ips2. The second switching circuit SW2 switches to a side "a" when the first peak time signal Tps1 assumes High level (the first peak time), and outputs the first peak current correction setting signal Ips1 as the peak current setting signal Ipr while outputting the second peak current correction setting signal Ips2 as the peak current setting signal Ipr when the first peak time signal Tps1 assumes Low level (the second peak time).

The second embodiment enjoys the same advantages as those of the first embodiment. Further, by decreasing the second peak current value when the tip-base distance becomes greater than the reference value, a proper droplet transfer is performed and high quality welding is provided.

The third embodiment of the present invention will now be described below.

According to the third embodiment, the distance difference signal ΔL described above for the first and the second embodiments is calculated from the welding current average setting signal Iar and the welding current average.

Figure 8:
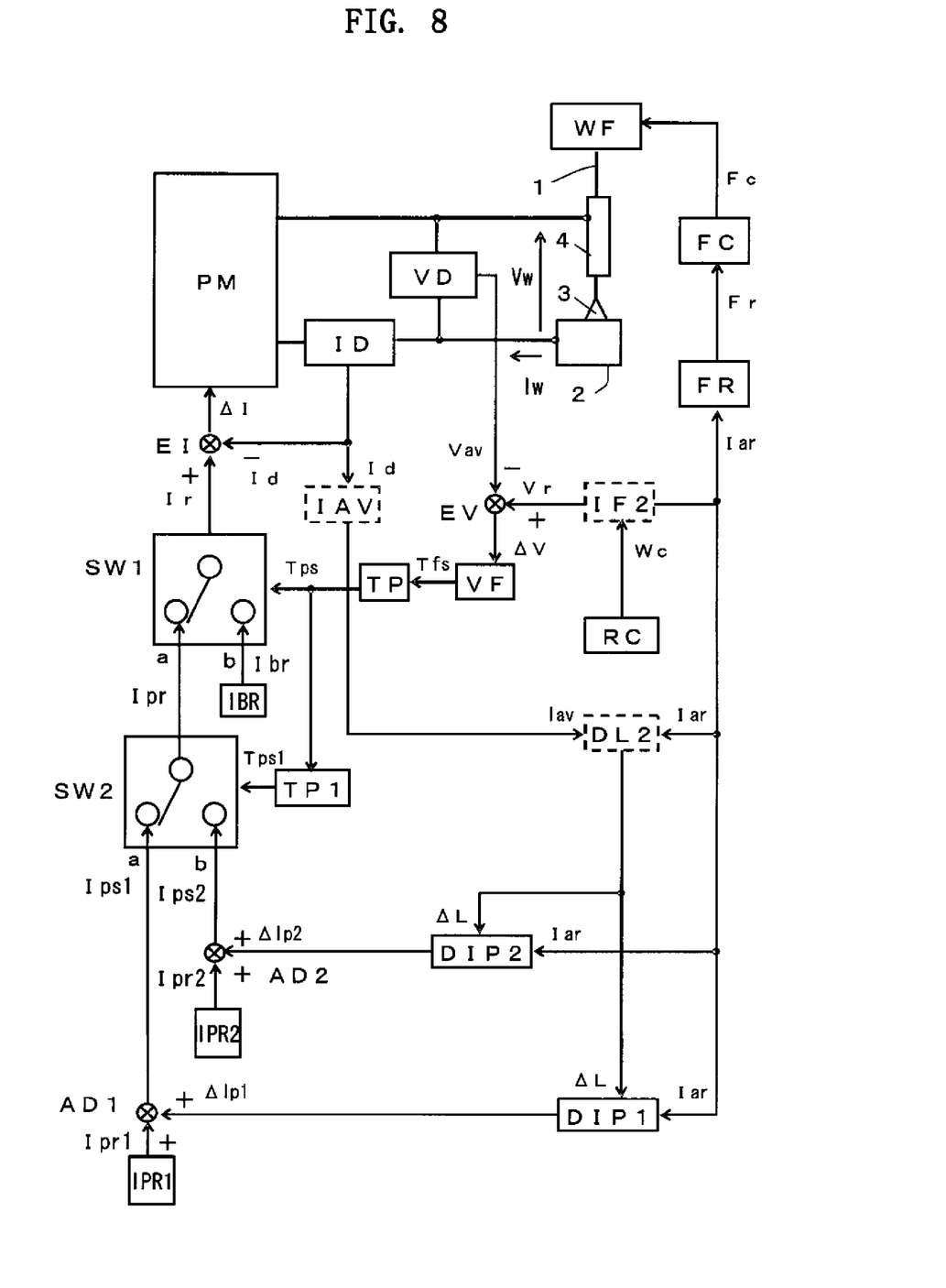
FIG. 8 a block diagram of a welding power source for implementing a pulse arc welding method according to a third embodiment.

FIG. 8 is a block diagram of a welding power source for implementing the pulse arc welding method according to the third embodiment. In FIG. 8, those blocks which are identical or similar to those described above with reference to FIG. 4 and FIG. 7 are indicated by the same reference symbols. FIG. 8 is essentially the same as FIG. 7, differing in that the interface circuit IF is replaced by a second interface circuit IF2 drawn in broken lines, the distance difference calculation circuit DL is replaced by a second the distance difference calculation circuit DL2, and a welding current average detection circuit IAV is added.

The second interface circuit IF2 receives the welding condition signal Wc from the robot controller RC as an input, and outputs the welding voltage setting signal Vr and the welding current average setting signal Iar both contained in the signal Wc. The above-described tip-base distance signal Lws is not used in the third embodiment. The welding current average detection circuit IAV works out an average of the current detection signal Id, and outputs a welding current average detection signal Iav. The second distance difference calculation circuit DL2 receives the welding current average setting signal Iar and the welding current average detection signal Iav as inputs, and outputs a distance difference signal ΔL=α·(Iav−Iar), where α is a constant.

The reason that the distance difference ΔL between the tip-base distance Lw and the reference value Lt can be calculated from the welding current average setting signal Iar and the welding current average detection signal Iav is as follows. When the wire feeding rate is constant, the welding current average is in inverse relation to the tip-base distance Lw. When the tip-base distance Lw is equal to the reference value Lt, the feeding rate setting circuit FR outputs the wire feeding rate setting signal Fr so that the welding current average will be equal to the welding current average setting signal Iar. In other words, when the tip-base distance Lw is equal to the reference value Lt, the welding current average is equal to the welding current average setting signal Iar. As the tip-base distance Lw becomes smaller than the reference value Lt, the welding current average becomes greater than the welding current average setting signal Iar. On the other hand, as the tip-base distance Lw becomes greater than the reference value Lt, the welding current average becomes smaller than the welding current average setting signal Iar. Thus, the following relation holds: The distance difference ΔL=Lt−Lw=α·(Iav−Iar).

The system of FIG. 8 is based on that of FIG. 7. Alternatively, it is possible to provide a system based on that of FIG. 4. According to the third embodiment, there is no need to calculate the tip-base distance signal Lws in the robot controller RC, and the distance difference ΔL is calculated from the welding current average setting signal Iar and the welding current average detection signal Iav. This eliminates the need to calculate a tip-base distance signal Lws and input it to the welding power source, and still the same advantages as offered by the first and second embodiments can be enjoyed.

In the above-described three embodiments, the peak rise time Tup and the peak fall time Tdw are short enough to provide a square pattern of peak current, though the present invention is not limited to this. For instance, the peak rise time Tup and the peak fall time Tdw may be significantly long so that the peak current has a trapezoidal pattern. Also, the present invention is applicable to an alternating current pulse arc welding method where part of the base time Tb is in electrode negative polarity, while the remaining part thereof is in electrode positive polarity.

The invention claimed is:

1. A pulse arc welding method for performing welding by causing welding current to flow through a welding wire and a base metal via a power supply tip so that an arc is ignited between the welding wire and the base metal, and the arc causes a molten droplet to transfer from the welding wire and the base metal, the welding current having a pulse cycle made up of a first peak time, a second peak time and a base time, the method comprising the steps of:

applying a first peak current during the first peak time;
applying a second peak current during the second peak time, the second peak current being smaller than the first peak current; and
applying a base current during the base time;
wherein when a tip-base distance between an end of the power supply tip and the base metal is smaller than a reference value, the first peak current is increased in accordance with a difference between the reference value and the tip-base distance.

2. The pulse arc welding method according to claim 1, wherein when the tip-base distance is greater than the reference value, the second peak current is reduced in accordance with a difference between the reference value and the tip-base distance.

* * * * *